(12) United States Patent
Li

(10) Patent No.: US 12,386,620 B2
(45) Date of Patent: Aug. 12, 2025

(54) PROCESSOR AND METHOD FOR EXECUTING AN INSTRUCTION WITH A PROCESSOR

(71) Applicant: METAX INTEGRATED CIRCUITS (SHANGHAI) CO., LTD., Shanghai (CN)

(72) Inventor: Ying Li, Shanghai (CN)

(73) Assignee: METAX INTEGRATED CIRCUITS (SHANGHAI) CO., LTD., Shanghai (CN)

( * ) Notice: Subject to any disclaimer, the term of this patent is extended or adjusted under 35 U.S.C. 154(b) by 25 days.

(21) Appl. No.: 18/279,664

(22) PCT Filed: Dec. 9, 2021

(86) PCT No.: PCT/CN2021/136821
§ 371 (c)(1),
(2) Date: Aug. 31, 2023

(87) PCT Pub. No.: WO2022/199131
PCT Pub. Date: Sep. 29, 2022

(65) Prior Publication Data
US 2024/0311155 A1  Sep. 19, 2024

(30) Foreign Application Priority Data
Mar. 25, 2021 (CN) .......................... 202110322336.X

(51) Int. Cl.
*G06F 9/30* (2018.01)
(52) U.S. Cl.
CPC .................. *G06F 9/3013* (2013.01)
(58) Field of Classification Search
None
See application file for complete search history.

(56) References Cited

U.S. PATENT DOCUMENTS

| 4,723,204 A | 2/1988 | Khera |
| 7,634,621 B1 | 12/2009 | Coon et al. |

(Continued)

FOREIGN PATENT DOCUMENTS

| CN | 1285064 A | 2/2001 |
| CN | 1656444 A | 8/2005 |

(Continued)

OTHER PUBLICATIONS

Yu, Chao, et al., Improving Thread-level Parallelism in GPUs through Expanding Register File to Scratchpad Memory, 2018, ACM, pp. 48:1-48:24 (Year: 2018).*

(Continued)

*Primary Examiner* — Eric Coleman

(57) ABSTRACT

The invention discloses a processor and a method for executing an instruction with a processor. The processor comprises a set of tiny register files, each of which is connected correspondingly to one of the set of register files and is configured to temporarily store the operand and the output result of the instruction executed by the plurality of physical threads; and an operand collector, which is connected to the set of register files and to the set of tiny register files and is configured to read the operand of the instruction executed by the plurality of physical threads from the set of register files and/or from the set of tiny register files and write the output result of the instruction executed by the plurality of physical threads to the set of register files and/or to the set of tiny register files. The embodiment of the application can significantly reduce reading and writing times of the register files when the instructions are executed with the processor and reduce dynamic power consumption of the processing chip while boosting the computation speed of the processor.

20 Claims, 11 Drawing Sheets

(56) References Cited

U.S. PATENT DOCUMENTS

| | | | |
|---|---|---|---|
| 8,200,949 B1* | 6/2012 | Tarjan | G06F 9/5011 |
| | | | 712/225 |
| 11,204,765 B1* | 12/2021 | Du | G06F 9/30087 |
| 2003/0070013 A1* | 4/2003 | Hansson | G06F 9/3867 |
| | | | 712/E9.032 |
| 2006/0095731 A1 | 5/2006 | Bustan et al. | |
| 2009/0121756 A1* | 5/2009 | Chandran | G11C 19/00 |
| | | | 327/144 |
| 2013/0151809 A1 | 6/2013 | Maruyama | |
| 2019/0073241 A1* | 3/2019 | Sideris | G06F 9/3888 |

FOREIGN PATENT DOCUMENTS

| | | |
|---|---|---|
| CN | 1688974 A | 10/2005 |
| CN | 1708745 A | 12/2005 |
| CN | 101124539 A | 2/2008 |
| CN | 103197916 A | 7/2013 |
| CN | 103218208 A | 7/2013 |
| CN | 103631660 A | 3/2014 |
| CN | 108595258 A | 9/2018 |
| CN | 112083954 A | 12/2020 |

OTHER PUBLICATIONS

Bailey, J. et al., Scratch That (But Cache This): A Hybrid Register Cache/Scratchpad for GPUs, 2018, IEEE, pp. 2779-2789. (Year: 2018).*

Kim, k. et al., WIR: Warp Instruction Reuse to Minimize Repeated Computations in GPUs, 2018,IEE, pp. 389-402. (Year: 2018).*

Abdel-Majeed et al., Warped Register File: A Power Efficient Register File for GPGPUs, «2013 IEEE 19th International Symposium on High Performance Computer Architecture (HPCA)», 2013 , 1-12.

Li et al., A STT-RAM-based lowpower hybrid register file for GPGPUs, «DAC'15 : Proceedings of the 52nd Annual Design Automation Conference» , 2015 , 1-6.

Ge et al., Optimized Password Recovery for SHA-512 on GPUs . «2017 IEEE International Conference on Computational Science and Engineering (CSE) and IEEE International Conference on Embedded and Ubiquitous Computing (EUC)» , 2017 , vol. 2 pp. 1-4.

He et al., Thread Scheduling Optimization of General Purpose Graphics Processing Unit: A Survey, vol. 39, No. 9, Sep. 2016.

* cited by examiner

FIG. 6

PROCESSOR AND METHOD FOR EXECUTING AN INSTRUCTION WITH A PROCESSOR

RELATED APPLICATIONS

The application is the U.S. national phase of PCT/CN2021/136821 filed Dec. 9, 2021, which claims the benefit of CN202110322336.X filed Mar. 25, 2021, each of which is incorporated herein by reference in its entirety.

FIELD OF THE INVENTION

The present application relates to the technical field of processors, and in particular to a processor and a method for executing an instruction with a processor.

BACKGROUND OF THE INVENTION

In high-performance computing chips such as GPU (Graphics Processing Unit)/GPGPU (General-purpose Computing on Graphics Processing Unit), frequent read and write access to the general-purpose register (GPR) file is required for instruction execution. However, in existing GPU/GPGPU processing chips, the general-purpose register file is usually implemented using static random access memory (SRAM). The frequent read and write access to SRAM memory can result in significant dynamic power consumption of the chip. As GPU/GPGPU computing performance continuously upgrades, the number of GPRs in the chip also increases significantly. Typically, a physical thread can have up to 512 GPRs, and the power consumption of GPRs rapidly increases with their quantity.

OBJECTS AND SUMMARY OF THE INVENTION

The present application provides a processor and a method for executing an instruction with a processor, which can significantly reduce the read-write times of the register file and reduce the dynamic power consumption of a processing chip while boosting the computation speed of the processor.

An embodiment of the present application provides a processor, comprising:
  a set of register files, each of which is configured to store an operand and an output result of an instruction executed by a plurality of physical threads;
  a set of tiny register files, each of which is connected correspondingly to one of the set of register files and is configured to temporarily store the operand and the output result of the instruction executed by the plurality of physical threads;
  an operand collector, which is connected to the set of register files and to the set of tiny register files and is configured to: read the operand of the instruction executed by the plurality of physical threads from the set of register files and/or from the set of tiny register files, and write the output result of the instruction executed by the plurality of physical threads to the set of register files and/or to the set of tiny register files; and
  a set of computing elements, each of which is connected to the operand collector and is configured to: acquire the operand from the operand collector, perform computation in the execution of the instruction executed by the plurality of physical threads and output a result to the operand collector.

Preferably, each one of the tiny register files includes at least one set of tiny registers, and is so configured that a warp accesses exactly one set of the at least one set of tiny registers.

Preferably, the tiny register includes a storage structure implemented with a set of D-latches.

Preferably, each one set of the at least one set of tiny registers is configured to have a locked state and an unlocked state: when the one set of the at least one set of tiny registers is assessed by a warp, the one set of tiny registers is in the locked state, but when the one set of the at least one set of tiny registers is not assessed by any warp, the one set of tiny registers is in the unlocked state.

Preferably, each one set of the at least one set of tiny registers is configured to permit access by a warp only when the one set of tiny registers is in the unlocked state.

Preferably, each one set of the at least one set of tiny registers is configured to enter the locked state in response to an order being executed to lock the tiny register and enter the unlocked state in response to an order being executed to unlock the tiny register.

Preferably, the instruction executed by a plurality of physical threads includes a first instruction field, and the first instruction field is configured to cause the operand to be written to a specified tiny register when the operand is being read from the register file for the operand collector.

Preferably, the instruction executed by a plurality of physical threads includes a second instruction field, and the second instruction field is configured to cause the operand to be read from a specified tiny register for the operand collector.

Preferably, the instruction executed by a plurality of physical threads includes a third instruction field, and the third instruction field is configured to cause the output result of the instruction executed by a plurality of physical threads to be written from the operand collector to a specified tiny register.

Preferably, the processor further comprises an identifier for indicating whether each one set of tiny registers is in the locked state.

Another embodiment of the present application provides method for executing an instruction with a processor, which is applicable to the processor in any of aforementioned embodiments and comprises the steps of:
  S20) executing at least an instruction in the first instruction field which orders an operand to be written to a tiny register file; and reading the operand for a set of tiny registers of the tiny register file when the operand of indication in the first instruction field is being read from the register file; and
  S30) executing at least an instruction in second instruction field which orders an operand to be read the operand from the tiny register file; and reading the operand from the set of tiny registers of the tiny register file.

Preferably, in S20: the instruction in the first instruction filed further orders an output result to be written to the tiny register file; and S20 further includes writing the output result of the instruction in the first instruction field to the set of tiny registers of the tiny register file.

Preferably, in S30: the instruction in the second instruction filed further orders an output result to be written to the tiny register file; and S30 further includes writing the output result of the instruction in the second instruction filed to the set of tiny registers of the tiny register file.

Preferably, the method further comprises S10 which precedes S20; and S10 includes executing an instruction to lock a tiny register; and causing the set of tiny registers of the tiny register file to enter a locked state.

Preferably, the method further comprises S40 which succeeds S30, and S40 includes executing an instruction to unlock a tiny register; and causing the set of tiny registers of the tiny register file to enter an unlocked state.

Preferably, S10 further includes: S10.1) determining whether the tiny register file includes a set of tiny registers which is not in the locked state; and S10.2) if it does not, repeating S10.1 after a designated clock period expires until a set of tiny registers in the tiny register file is not in the locked state.

Another one embodiment of the present application provides a method for executing an instruction with a processor, which is applicable to the processor in any of aforementioned embodiments and comprises the steps of:

S20) executing at least an instruction in the third instruction field which orders an output result to be written to a tiny register file; and writing the output result of the instruction in the first instruction field to a set of tiny registers of the tiny register file.

S30) executing at least an instruction in the second instruction filed which orders an operand to be read from the tiny register file; and reading the operand from the set of tiny registers of the tiny register file.

Preferably, the method further comprises S10 which precedes S20; and S10 includes executing an instruction to lock a tiny register; and causing the set of tiny registers of the tiny register file to enter a locked state.

Preferably, the method further comprises S40 which succeeds S30; and S40 includes executing an instruction to unlock a tiny register; and causing the set of tiny registers of the tiny register file to enter an unlocked state.

Preferably, S10 further includes: S10.1) determining whether the tiny register file includes a set of tiny registers that is not in the locked state; and S10.2) if it does not, repeating S10.1 after a designated clock period expires until the tiny register file includes a set of tiny registers that is not in the locked state.

Compared to prior art, the present application has at least the following beneficial effects: the application temporarily stores instruction operands and output results through tiny register files, and reads instruction operands directly from tiny register files during instruction execution, so as to reduce times of frequent reading of operands from register files, significantly reduce read-write times of the register files and transform into reading and writing of tiny register files with lower power consumption, thereby reducing dynamic power consumption due to reading and writing of the register files. The tiny register file is smaller in areas than the register file. Moreover, the tiny register file doubles if not quadruples the register file in bandwidth. Thus, the tiny register file boosts the computation speed of the processor by increasing the speed of read and write for the operand collector.

BRIEF DESCRIPTION OF FIGURES

The features, objects and advantages of the present application will be more fully understood from the following detailed description of non-limiting embodiments, taken in conjunction with the accompanying drawings, wherein:

FIG. 6 is a schematic diagram of a tiny register file comprising two set of tiny registers according to an example of the present application;

DETAILED DESCRIPTION OF THE EMBODIMENTS

Figure 1:
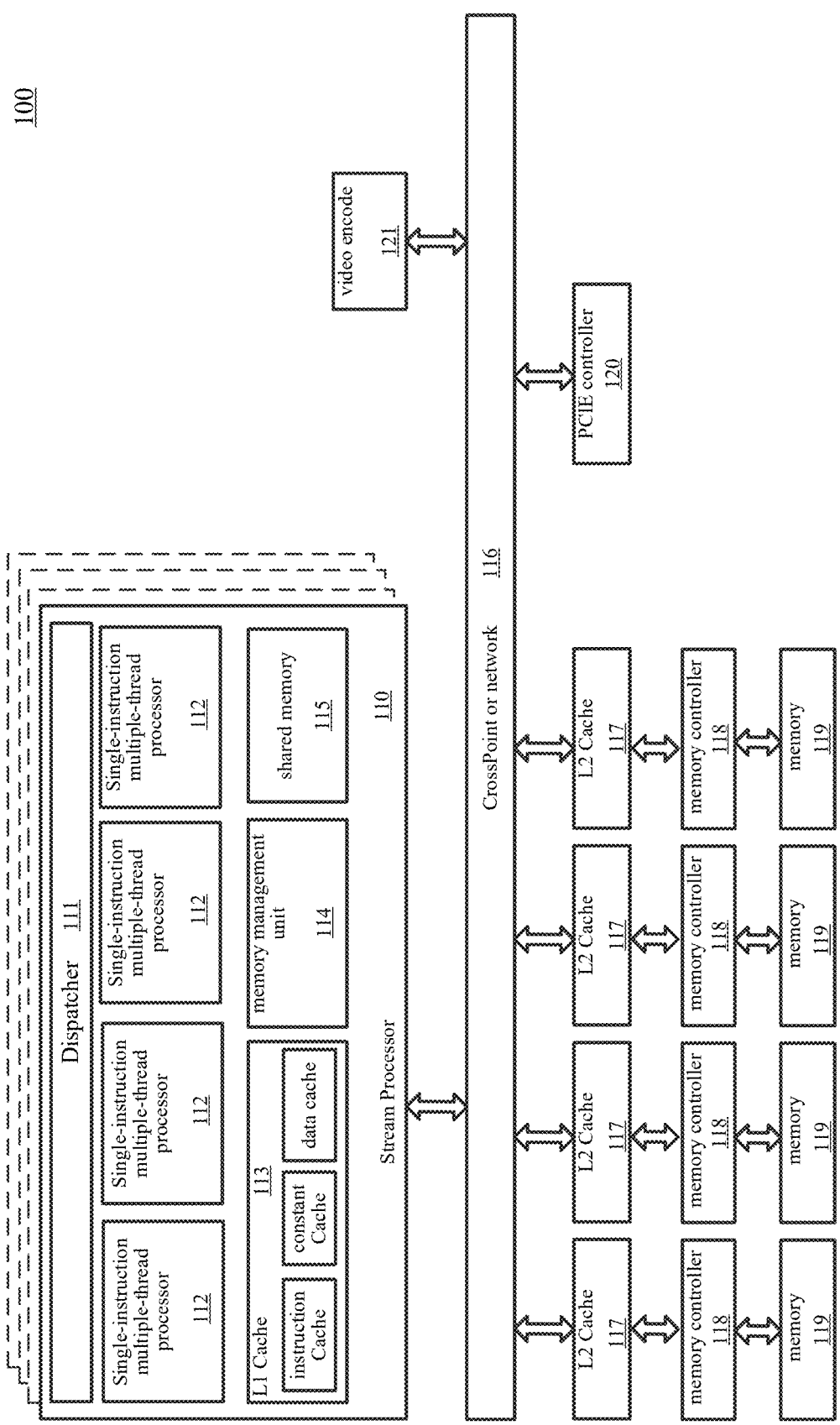
FIG. 1 is a schematic diagram of an exemplary structure of a conventional graphics processing unit (GPU) chip 100.

The technical solution of the present application is clearly and completely described below through embodiments and in conjunction with the accompanying drawings, but the present application is not limited to the embodiments described below. In view of the following embodiments, all other embodiments obtained by those of ordinary skill in the art without creative work are within the scope of the present application. Parts irrelevant to the description of the exemplary embodiments are omitted in the drawings for the sake of clarity.

It is to be understood that terms such as "include" or "have" or the like in this specification are intended to indicate the presence of the features, numbers, steps, acts, components, or their combinations disclosed in this specification, and do not exclude the possibility that one or more other features, numbers, steps, acts, components, or their combinations may be present or added. "A plurality of" in this application may be generally taken to mean two or more.

FIG. 1 is a schematic diagram of an exemplary structure of a conventional graphics processing unit (GPU) chip 100. As shown in FIG. 1, the GPU chip 100 typically includes one or more stream processors 110. The stream processor (SP) 110 also may include one or a plurality of stream processors 110. A stream processor 110 may include a dispatcher 111, one or a plurality of single-instruction multiple-thread (SIMT) processors 112, one or a plurality of L1 caches 113, a memory management unit (MMU) 114 and a shared memory 115. A stream processor 110 performs reading and writing of data with one or a plurality of L2 caches H7 and a PCIE controller 120 through a crossbar matrix or a crossbar network 116. Additionally, the GPU chip 100 also may include a video CODEC (Coder and Decoder) 121 and/or other processing cores (not shown in the figure).

In the GPU chip 100, in order to achieve high-performance access to data, a plurality of static random access memories (SRAM), such as register files (shown in FIG. 2) of single-instruction multiple-thread processor (SIMT) 112, L1 caches H3 (instruction cache, constant cache, data cache), a shared memory H5, a memory management unit 114 and a plurality of FIFO queues (not shown in the figure), etc., are used.

In the single-instruction multiple-thread (SIMT) processor 112, warp is the basic unit for instruction execution. A warp includes a plurality of threads executing the same instruction in parallel with different data resources. The number of threads executing in parallel in a warp is warp size, usually using 16, 32, or 64 threads in parallel. A single-instruction multiple-thread (SIMT) processor may include 8-16 warps, and a stream process may include 32-128 warps.

Figure 2:
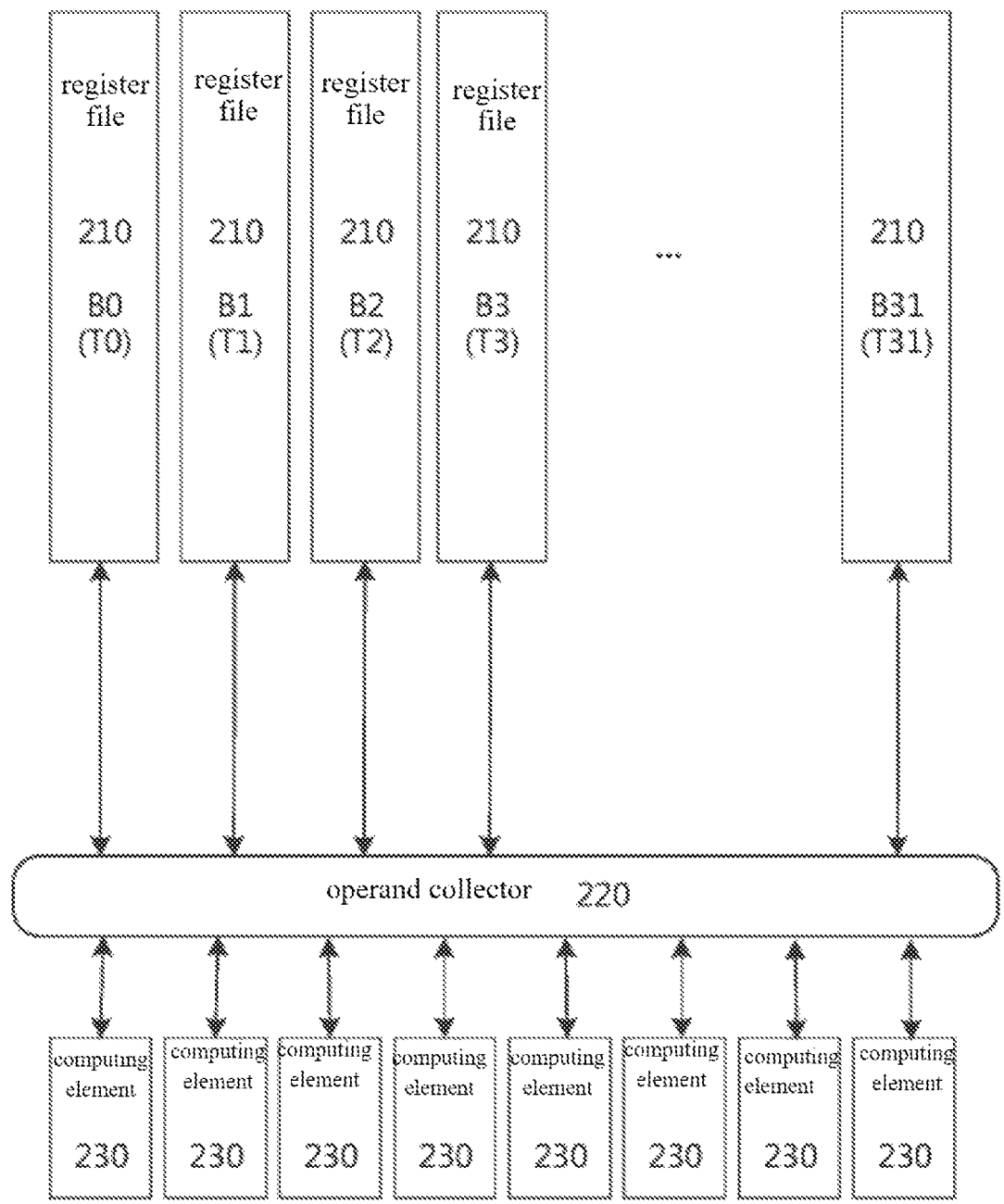
FIG. 2 is a schematic diagram of the structure of the SIMT processor having 8 computing elements.

FIG. 2 illustrates an example of a structure of a single-instruction multiple-thread (SIMT) processor. As shown in FIG. 2, a single-instruction multiple-thread (SIMT) processor 112 typically contains a set of register files 210, an operand collector 220 and a plurality of computing units 230. The register file 210 is implemented in static random access memories (SRAM), and the operand collector 220 and computing units 230 are implemented in combinational logic.

In the example, the SIMT processor includes eight computing units and thirty-two physical threads T0-T31 (also as Threads 0-31 in the present application). In the thirty-two physical threads T0-T31, each physical thread includes 128, 192, or 256 32-bit SRAM modules. When a dual-port SRAM module is used, thirty-two 32-bit data can be read and written simultaneously per clock period. The register files corresponding to each physical thread can also be called a register BANK, and thirty-two physical threads T0-T31 correspond to thirty-two register banks B0-B31. If the depth of each register BANK is 256, then the one set of register files 210 is equivalent to a storage structure of 32 Bits*256*32 Banks.

The operand collector 220 typically includes an operand queue for instruction execution and an output result queue, and is configured to read the operand of the instruction from the register files 210 and to write the output result of the instruction to the corresponding register files 210.

When the operands of an instruction are read from the corresponding register files and put into the corresponding operand queue, that is, when all operands of an instruction are ready, the instruction is sent to the computing units 230 for execution.

A computing unit 230 may include an integer execution unit, a floating-point executing unit, a transcendental function executing unit, a tensor computing unit and other computing units. Each computing unit typically includes three operand input ports, which means that three data can be read in per clock period.

A register file 210 in the SIMT processor is usually implemented by a vector general-purpose register (VGPR). The number of VGPRs corresponding to each physical thread is very large, including 128, 192 and or up to 512 VGPRs. The power consumption of VGPRs increases rapidly with increase of the number, and the instruction sequence of a GPU may repeatedly read and write the same VGPR, resulting in a large amount of register reading and writing power consumption.

Referring to the following code snippet (hereinafter referring as target sample code):

```
__kernel void OpenCL2( __global float*A, __global float*B, __global float*C){intgid = get__global__id(0);
  float3 fA;
  float3 fB;
  fA[0] = A[gid*3 + 0];
  fA[1]=A[gid*3 + 1];
  fA[2]=A[gid*3 + 2];
  fB[0]=B[gid*3 + 0];
  fB[1] = B[gid*3 + 1];
  fB[2]=B[gid*3 + 2];
  float3 result = 0;
  for(inti=0; i< 16; i++){
  result = result * fA + fB;
  result = result + fA;
  }
  C[gid] = result[O] + result[1] + result[2];
}
```

The target sample code is mainly used to perform 16 times of cyclic multiplication and addition calculation on vectors fA and fB. By supposing that the registers R0, R1 and R2 are used to store the vector fA, the registers R3, R4 and R5 are used to store the vector fB, and the registers R6, R7 and R8 are used to store a result vector, the code can be converted into a fused multiply-add (FMA) operation instruction sequence of 16 cycles.

FMA R6, R6, R0, R3
FMA R7, R7, R1, R4
FMA R8, R8, R2, R5
FMA R6, R6, R3, R0
FMA R7, R7, R4, R1
FMA R8, R8, R5, R2
. . . .

Then, after fused multiply-add (FMA) operation instruction of 16 cycles is performed, the cumulative reading and writing times to the registers R0-R8 required by the instruction sequence can be referred to the following Table 1.

As shown in Table-1, the exemplary processor structure shown in FIG. 2 performs a large reading and writing times to the VGPR registers, resulting in a large amount of register reading and writing power consumption.

TABLE 1

Register Reading and Writing Times by Target Example Code in Existing Processor Structure

| Register | Read times of VGPR in cycle | Write times of VGPR in cycle |
|---|---|---|
| R0 | 32 | |
| R1 | 32 | |
| R2 | 32 | |
| R3 | 32 | |
| R4 | 32 | |
| R5 | 32 | |
| R6 | 32 | 32 |
| R7 | 32 | 32 |
| R8 | 32 | 32 |
| TOTAL | 288 | 96 |

Figure 3:
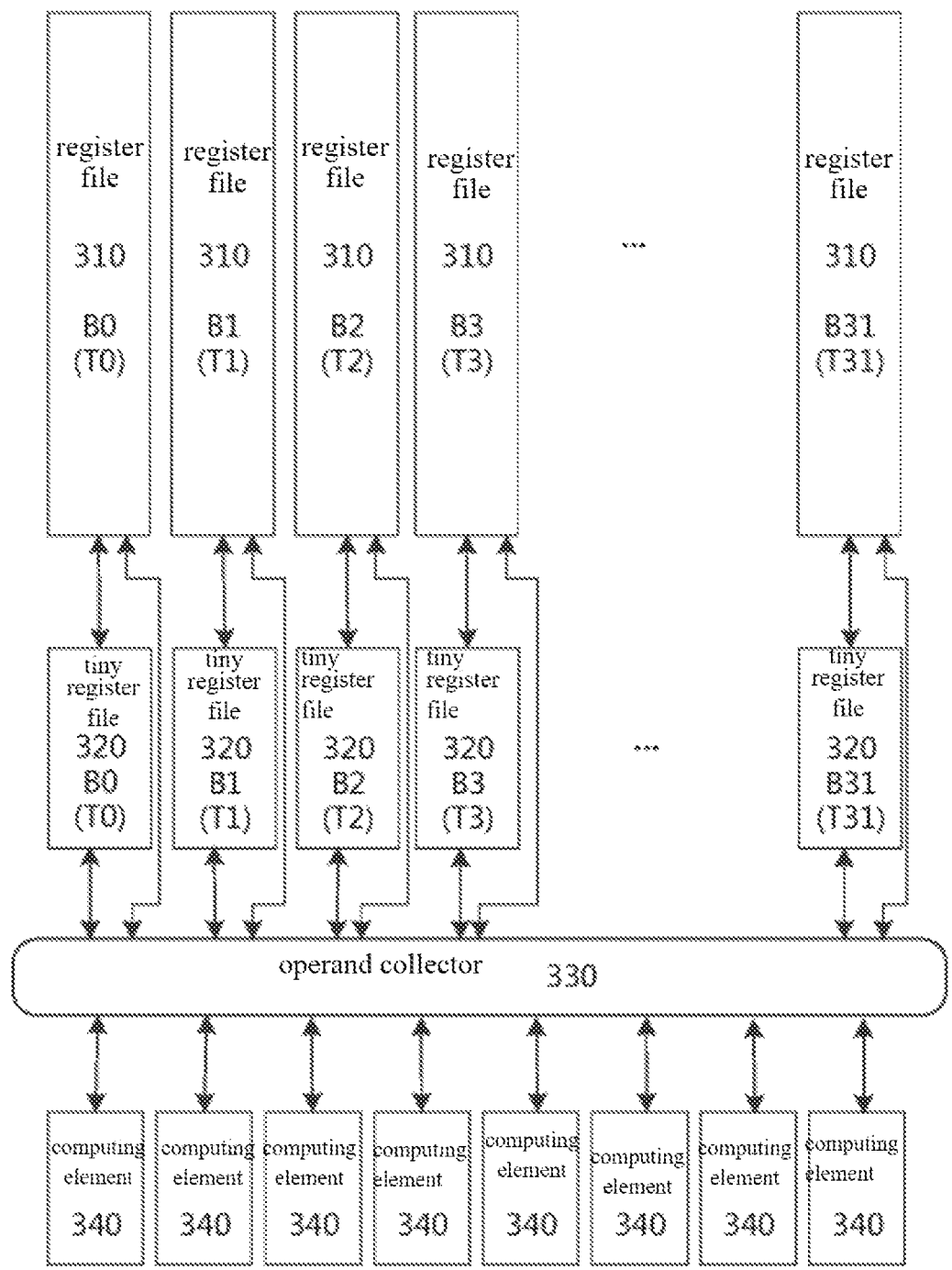
FIG. 3 is a schematic diagram of a processor 300 according to an example of the present application.

FIG. 3 is a schematic diagram of a processor 300 according to an example of the present application. As shown in FIG. 3, a processor 300 according to the embodiment of the present application comprises:
 a set of register files 310, each of which is configured to store an operand and an output result of an instruction executed by a plurality of physical threads;
 a set of tiny register files 320, each of which 320 is correspondingly connected to one of the set of register files 310 and is configured to temporarily store the operand and the output result of the instruction executed by the plurality of physical threads;

an operand collector 330, which is connected to the set of register files 310 and to the set of tiny register files 320 and is configured to: read the operand of the instruction executed by the plurality of physical threads from the set of register files 310 and/or the set of tiny register files 320, and write the output result of the instruction executed by the plurality of physical threads to the set of register files 310 and/or the set of tiny register files 320; and a set of computing elements 340, each of which is connected to the operand collector 330 and is configured to: acquire the operand from the operand collector 330, perform computation in the execution of the instruction executed by the plurality of physical threads and output a result to the operand collector 330.

In the example, each physical thread in the processor corresponds to a register bank implemented by an SRAM memory. FIG. 3 only schematically shows an embodiment of thirty-two physical threads T0-T31 and the corresponding thirty-two register banks B0-B31. However, the number of threads in register files 310 depends on the number of parallel threads supported by the warp of the processor to execute instructions, which can be implemented in various ways such as 16, 32 and 64, and not limited to the thirty-two threads shown schematically in FIG. 3. In addition, FIG. 3 only schematically shows eight computing units 340, in fact, the embodiment of the present application may not be limited to eight computing units.

In the example, the tiny register files 320 are simultaneously connected to the register files 310 and the operand collector 330 and configured to temporarily store the operand and the output result of the instruction executed by the plurality of physical threads. Thus, the readout target of a register file 310 corresponding to each physical thread can be either the operand collector 330 or a tiny register file 320. The source of the operands in the operand collector 33 can be either a register file 310 or a tiny register file 320. The output result of the computing units 340 can be written to the register files 310 and the tiny register files 320.

When a computing unit 340 executes a computation of at least one instruction, the operand of an instruction can be read directly from the tiny register files 320 to reduce the times of frequent reading of the operand from the register files 310. Because the tiny register file 320 uses a storage structure different from an SRAM memory, it has lower voltage and lower power consumption than the SRAM memory, and the area can decrease directly proportionally with improvement of process. Therefore, the example of the present application can reduce the register file reading and writing times, and can significantly reduce dynamic power consumption of the chip.

Figure 4:
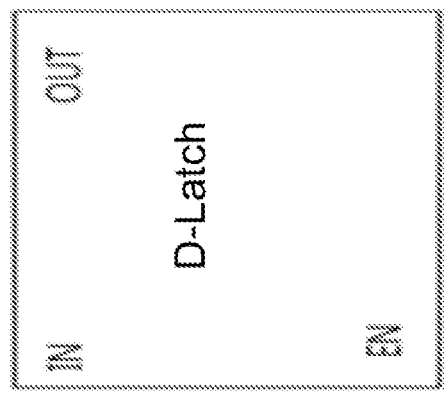
FIG. 4 is a circuit schematic diagram of a D-latch in tiny register files according to an example of the present application.
Figure 4:
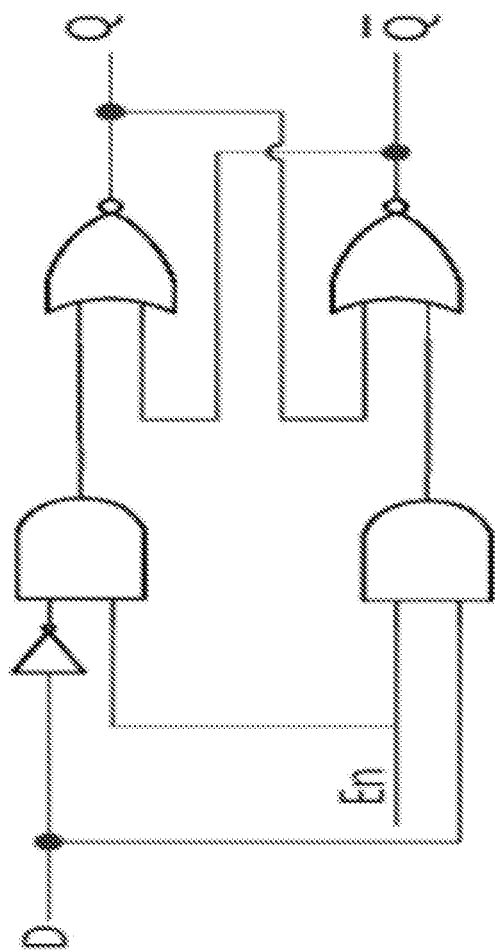

In some embodiments, a tiny register file 320 can be established by D-latches, and each one of the D-latches has lower voltage and power consumption and smaller circuit area than an SRAM memory. As shown in FIG. 4, a D-latch includes an input signal D, an enable signal EN and an output signal Q. It can be abstractly expressed as the circuit symbol depicted on the right of FIG. 4.

Figure 5:
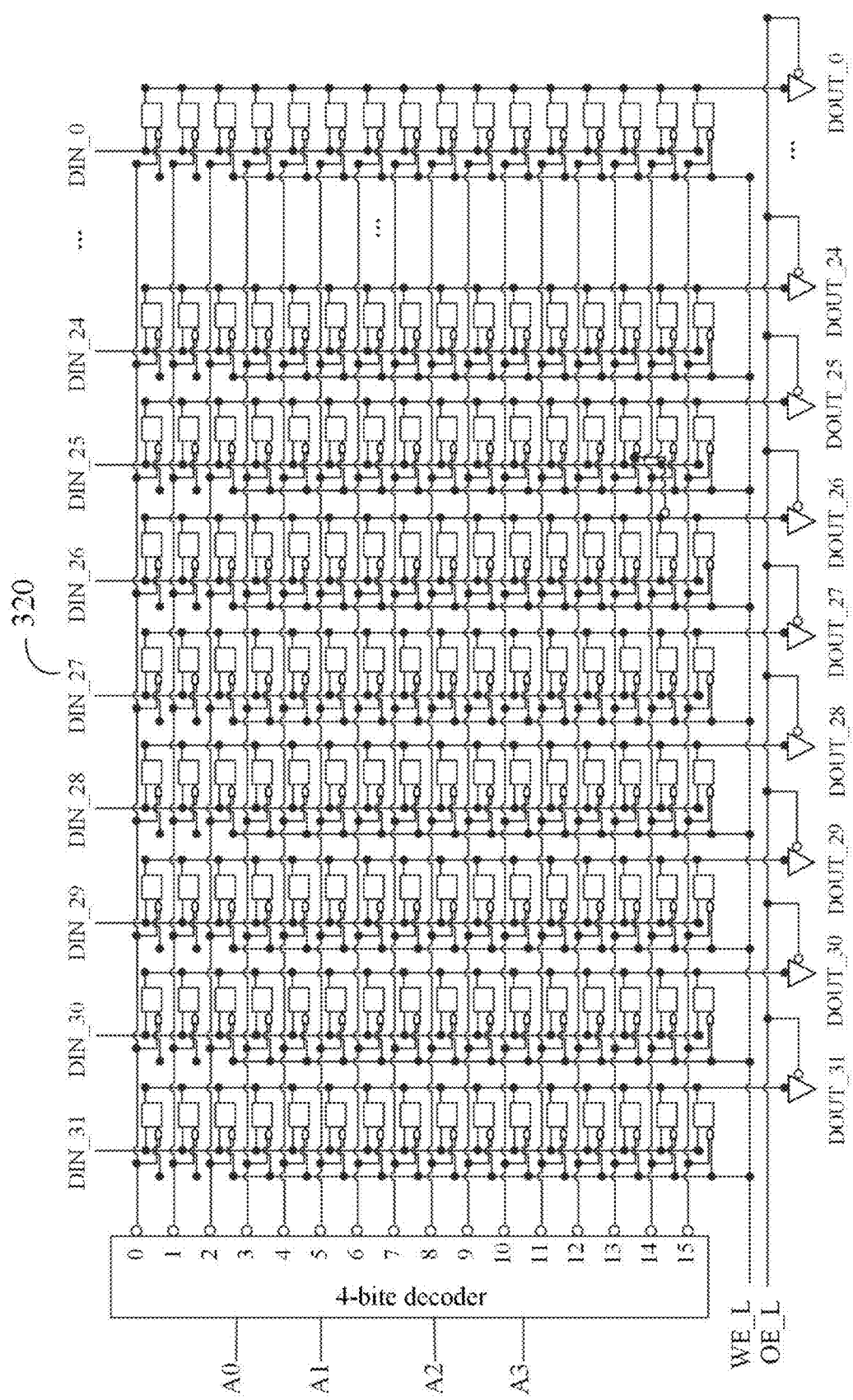
FIG. 5 is a circuit schematic diagram of tiny register files according to an example of the present application.

FIG. 5 is a circuit schematic diagram of tiny register files according to an example of the present application. FIG. 5 exemplifies an embodiment of sixteen 32-bit tiny registers in a tiny register file by using a D-latch bank. As shown in FIG. 5, the tiny register file includes four address inputs A0-A3, thirty-two data inputs DIN0-DIN31, a write enable signal (WE_L), an output enable signal (OE_L) and thirty-two data outputs DOUT0-DOUT31. The four address inputs A0-A3 can realize address addressing of sixteen tiny registers through a 4-bit decoder, wherein the BANK corresponding to each tiny register file includes sixteen tiny registers, and each line forms a 32-bit tiny register.

In some embodiments, each one of the tiny register files includes at least one set of tiny registers, and is so configured that a warp accesses exactly one set of the at least one set of tiny registers.

Figure 6:
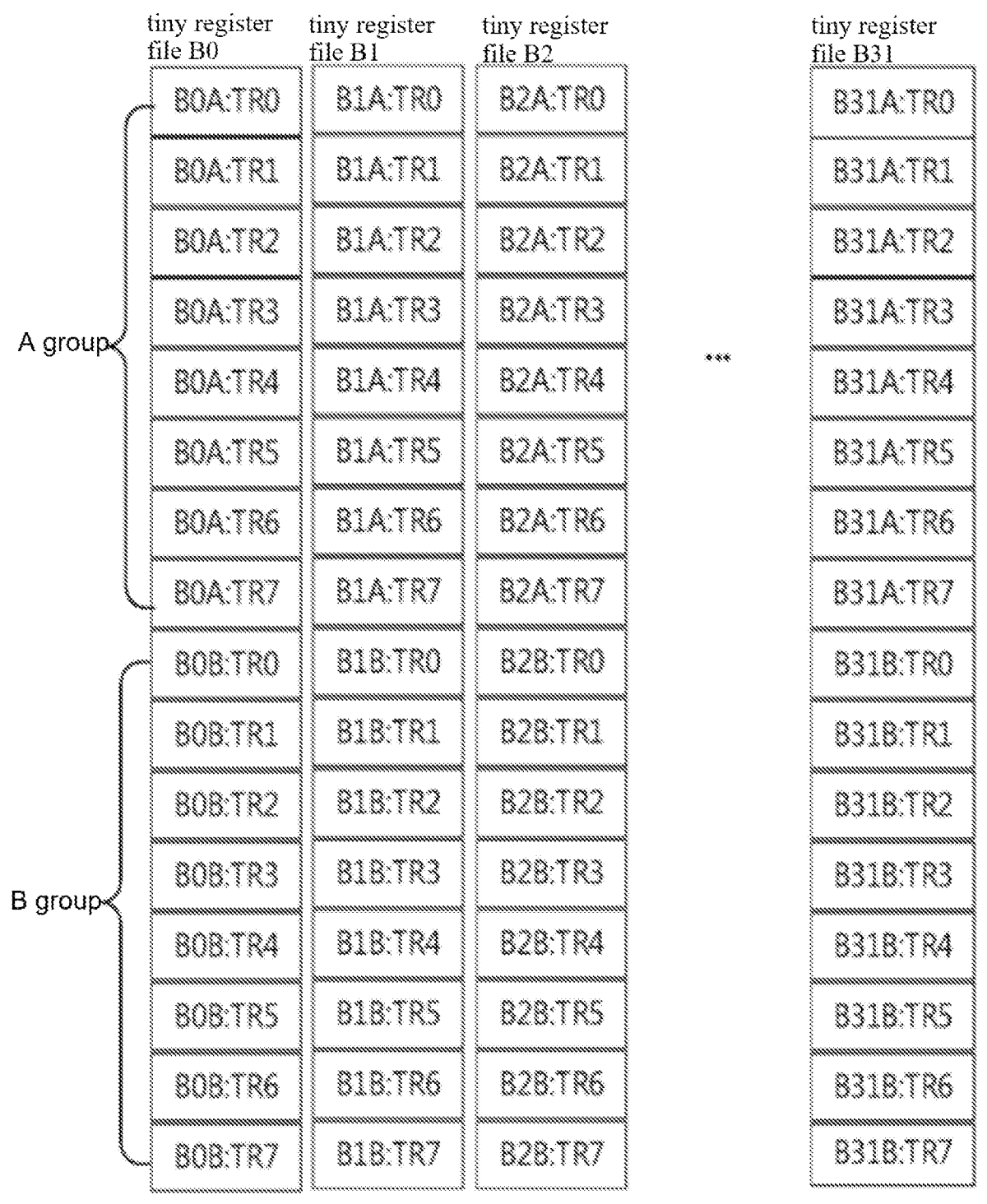

FIG. 6 is a schematic diagram of a tiny register file comprising two sets of tiny registers according to an example of the present application. As shown in FIG. 6, each one of the tiny register files B0-B31 includes a tiny register set-A (B0A-B31A) and tiny register set-B (B0B-B31B), and each one of the tiny register set-A and the tiny register set-B includes eight tiny registers TR0-TR7, respectively, and warp accesses exactly one of the tiny register set-A and the tiny register set-B. In some embodiments, depending on different power consumptions and area targets, each tiny register file can also include even numbers of tiny registers, such as 6, 8, 10, 12, 14, . . . , up to 32 tiny registers.

The example uses at least one set of tiny registers, especially more than two sets of tiny registers, in a tiny register file, so that the SIMT processor can realize single-instruction dispatching of two warps. When warp0 has instruction execution idle, the instruction of another warp1 can be dispatched. As a result, the operation is kept at high enough utilization rate, and more than 90% instruction dispatching efficiency is obtained.

In some embodiments, each one set of the at least one set of tiny registers is configured to have a locked state and an unlocked state: when the one set of the at least one set of tiny registers is assessed by a warp, the one set of tiny registers is in the locked state, but when the one set of the at least one set of tiny registers is not assessed by any warp, the one set of tiny registers is in the unlocked state.

In order to realize the scheme of the example of the present application, the present application defines a complete set of instructions to realize lock and unlock control and reading and writing operation of the tiny registers in the tiny register files.

In the following, the tiny register file structure shown in FIG. 6 is taken as an example for detailed explanation. Taking a computing unit executing a three-operand instruction as an example, the three operands acquired by the instruction can be read from the register files 310 to the tiny register files 320 and the operand collector 330 at the same time, and the output result of the instruction can be written to either the register files 310 or the tiny register files 320. The writing of each one tiny register requires 4 bits, so that the three operands require a total of 12 bits of instruction encoding. The instruction encoding written to each one tiny register is defined as follows.

| Bits | Value Definition |
| --- | --- |
| BITS[0:0] | 0: not writing to the tiny register files<br>1: writing to the tiny register files |
| BITS[1:3] | Index of tiny registers reading and writing the tiny register files<br>0: TR0<br>1: TR1<br>2: TR2<br>. . .<br>7: TR7 |

The format of an instruction for reading and writing the tiny registers in the tiny register files is defined as follows.
1) Writing of an Operand to the Tiny Register Files
With the following FMA instruction-1 as an example:
FMA R0, R1, R2, R3 SRC0:TR1 SRC1:TR2 SRC2:TR5
An instruction field configured to cause the operand to be read into a specified tiny register is included in the instruction. The instruction means to execute FMA instruction, and the operand is registers R1, R2 and R3 in the register files. The output result of the instruction is stored to the register R0 in the register files, and three source operands are stored to tiny registers TR1, TR2 and TR5 in the tiny register files respectively while the operand in registers R1, R2 and R3 is read. When the execution of the instruction completes, it is equivalent to execution of three MOV instructions, such that:
TR1=R1
TR2=R2
TR5=R3
Similarly, With the following FMA instruction-2 as an example:
FMA R8, R8, R2, R5 SRC1:TR2 SRC2:TR5
The instruction means to execute FMA instruction, and the operand is registers R8, R2 and R3 in the register files. The output result of the instruction is stored to the register R8 in the register files, and two source operands R2 and R5 are stored to tiny registers TR2 and TR5 in the tiny register files respectively while the operand in registers R8, R2 and R3 is read. When the execution of the instruction completes, it is equivalent to execution of two MOV instructions, such that:
TR2=R2
TR5=R5
2) Reading of an Operand from the Tiny Register Files
With the following FMA instruction-3 as an example:
FMA R4, TR2, TR5, TR1
An instruction field that instructs reading of an operand from a specified tiny register is included in the instruction. The instruction means to read the operand from registers TR2, TR5 and TR1 in the register files and execute an FMA operation. The output result is stored to the register R4 in the register files.
3) Writing of an Output Result in the Tiny Register Files
With the following FMA instruction-4 as an example:
FMA TR4, TR1, TR2, TR3
An instruction field configured to cause the output result of the instruction to be written to a specified tiny register is included in the instruction. The instruction means to read the operand from registers TR1, TR2 and TR3 in the register files and to execute an FMA operation. The output result is stored to the register R4 in the register files.
4) Lock and Unlock of a Tiny Register Set
An instruction to lock a tiny register and an instruction to unlock a tiny register are used in the examples of the present application to respectively lock and unlock each tiny register set.
The instruction to lock a tiny register is used to lock one set of tiny registers in the tiny register files. Before a warp executes instructions to read and write the one set of tiny registers, the set one of tiny registers can be locked by executing the instruction to lock a tiny register.
The instruction to unlock a tiny register is used to unlock a set of tiny registers in the tiny register files. After a warp executes instructions to read and write the set of tiny registers, the set of tiny registers can be unlocked by executing the instruction to lock a tiny register.
If both sets of tiny registers in the tiny register files are locked, the warp needs to wait until one set of tiny register is unlocked. An instruction for reading and writing the tiny registers can only be executed after the instruction to unlock a tiny register and before the instruction to lock a tiny register.

An SIMT processor may include two bits to identify whether the two sets of tiny registers are locked, as shown in the following table:

| Tiny register lock identifier TINY_REG_LOCKED | Value Definition |
| --- | --- |
| BIT[0:0] | 0: tiny register set-A is unlocked |
| | 1: tiny register set-A is locked |
| BIT[1:1] | 0: tiny register set-B is unlocked |
| | 1: tiny register set-B is locked |

Each warp may include two inline variables, as shown in the following table:

| Variables | Value Definition |
| --- | --- |
| Identifier for indicating whether the tiny registers are locked IS LOCKED TINY REG | 0: tiny register is unlocked |
| | 1: tiny register is locked |
| Locked tiny register index LOCKED TINY REG IDX | 0: tiny register set-A is locked |
| | 1: tiny register set-B is locked |

Figure 7:
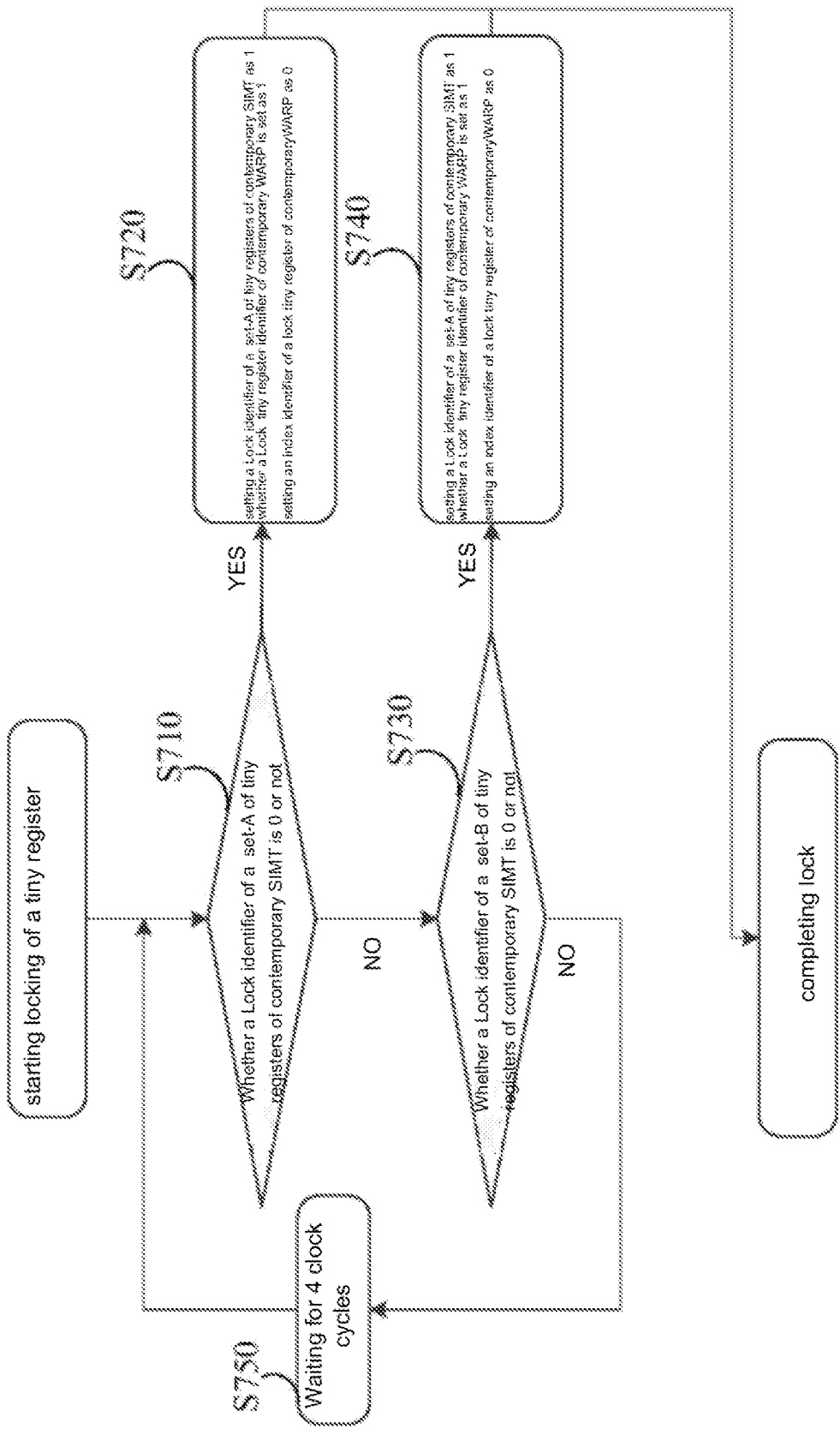
FIG. 7 is flow diagram of executing an instruction to lock a tiny register to acquire control right of a set of tiny registers.

FIG. 7 is flow diagram of executing an instruction to lock a tiny register by a warp[n] to try to acquire control right of a set of tiny registers. As shown in FIG. 7, the current warp starts trying to acquire control right of a set of tiny registers in the current SIMT processor (SIMTx).

In S710, it is first determined that whether a tiny register set-A lock identifier in the tiny register lock identifier TINY_REG_LOCKED of the current SIMT processor is 0 or not, that is, whether the tiny register set-A is unlocked, if YES, in S720, the lock identifier of the tiny register set-A of the current SIMT processor is set to be 1, the IS LOCKED TINY REG of the current warp to set to be 1, and the LOCKED TINY REG IDX of the current warp is set to be 0, so as to acquire control right of the tiny register set-A; and if NO, in S730, it is further determined that whether a tiny register set-B lock identifier in the tiny register lock identifier TINY_REG_LOCKED of the current SIMT processor is 0 or not, that is, whether the tiny register set-B is unlocked.

If YES, in S740, the lock identifier of the tiny register set-B of the current SIMT processor is set to be 1, the IS LOCKED TINY REG of the current warp to set to be 1, and the LOCKED TINY REG IDX of the current warp is set to be 1, so as to acquire control right of the tiny register set-A; and if NO, in S740, four clock periods are waited for, and S710 is executed until the control right of the tiny register set-A or the tiny register set-B is acquired.

After a warp[n] acquires control right of the tiny register set-A or the tiny register set-B through the instruction to lock a tiny register and executes at least one instruction sequence, the acquired control right of the tiny register set-A or the tiny register set-B can be unlocked through the instruction to unlock a tiny register. When the warp executes the instruction to unlock a tiny register, the TINY_REG_LOCKED of the current SIMT processor is deleted, that is TINY_REG_LOCKED of the tiny register set-A or the tiny register set-B of the SIMT processor is deleted, and the IS_LOCKED_TINY_REG of the current SIMT processor is set to be 0, so as to delete the locked tiny register identifier of the warp.

The pseudocode executed by the instruction unlock the tiny register can be represented schematically as follows:

```
SIMTx.TINY_REG_LOCKED_BIT =
SIMTx.TINY_REG_LOCKED_BIT& (~ (1 <<WARP[n] LOCKED_REG_IDX)); // delete
an identifier of a tiny register set-A or a tiny register set-B of the SIMT processor:
    WARP[n].IS_LOCKED_TINY_REG=0; // delete
IS_LOCKED_TINY_REG of the warp.
```

5) Optimization on Execution of Target Example Code

In view of the instruction set definition described in the above embodiments, the execution of the aforementioned target example code can be optimized. By supposing that fA[0], fA[1], fA[2], fB[0], fB[1], fB[2], result[0] and result[1] in a target sample code are stored in the tiny registers TR6 and TR7, respectively, result[2] is stored in the register R8. Then the compilation result of the target sample code under the processor structure of the present application can be expressed as follows.

Lock_tiny_register

FMA TR6, R6, R0, R3 SRC1:TR0, SRC2:TR3 //The operands fA[0] and fB[0] of the registers R0 and R3 are simultaneously written to the tiny registers TR0 and TR3 of the tiny register files, respectively.

FMA TR7, R7, R1, R4 SRC1:TR1, SRC2:TR4 //The operands fA[1] and fB[1] of the registers R1 and R4 are simultaneously written to the tiny registers TR1 and TR4 of the tiny register files, and the output results are written to tiny register TR7.

FMA R8, R8, R2, R5 SRC1:TR2, SRC2:TR5 //The operands fA[1] and fB[1] of the registers R2 and R5 are simultaneously written to the tiny registers TR2 and TR5 of the tiny register files.

FMA TR6, TR6, TR3, TR0
FMA TR7, TR7, TR4, TR1
FMA R8, R8, TR5, TR2
FMA TR6, TR6, TR0, TR3
FMA TR7, TR7, TR1, TR4
FMA R8, R8, TR2, TR5
. . . .
FMA R6, TR6, TR3, TR0
FMA R7, TR7, TR4, TR1
FMA R8, R8, TR5, TR2
Unlock_tiny_register Thus, after the target sample code performs 16 cycles of fused multiply-add (FMA) operation instruction, the cumulative reading and writing times executed by the optimized instruction sequence to the registers R0-R8 can be referred to the following Table 2.

| Register | Read times of VGPR in cycle | Write times of VGPR in cycle | Write times of tiny register files | Read times of tiny register files |
|---|---|---|---|---|
| R0 | 1 | 0 | 1 | 31 |
| R1 | 1 | 0 | 1 | 31 |
| R2 | 1 | 0 | 1 | 31 |
| R3 | 1 | 0 | 1 | 31 |
| R4 | 1 | 0 | 1 | 31 |
| R5 | 1 | 0 | 1 | 31 |
| R6 | 1 | 1 | 31 | 31 |
| R7 | 1 | 1 | 31 | 31 |
| R8 | 32 | 32 | 0 | 0 |
| Total | 40 | 34 | 68 | 248 |

It can be seen from the statistical data in Table 2 that: using the instruction sequence optimized by the present application, the reading from the register files is reduced to 40 times, the writing to the register files is reduced to 34 times, the reading from the tiny register files is 248 times, the writing to the tiny register files is 68 times. Since the dynamic power consumption of reading and writing to tiny register files is much lower than that to the register files by about 10%, by combining with the statistical data of reading and writing times of to the registers by the target example code in the existing processor structure in Table 1, it can be obtained that the ratio of reading and writing times to the register files in the examples of the present application to the existing scheme is approximately: (40+34)/(288+96)= 19.5%. Assuming that the power consumption of the tiny register file is 10% of the register file, the dynamic power consumption of the processor in the examples of the present application is 19.5%+ (80.5%)*10%=27.5% of the existing scheme. Thus, it can be seen that the examples of the present application can significantly reduce reading and writing times to the register files, and transform it into reading and writing to the tiny register file with lower power consumption, thereby reducing dynamic power consumption due to reading and writing to the register files.

Figure 8:
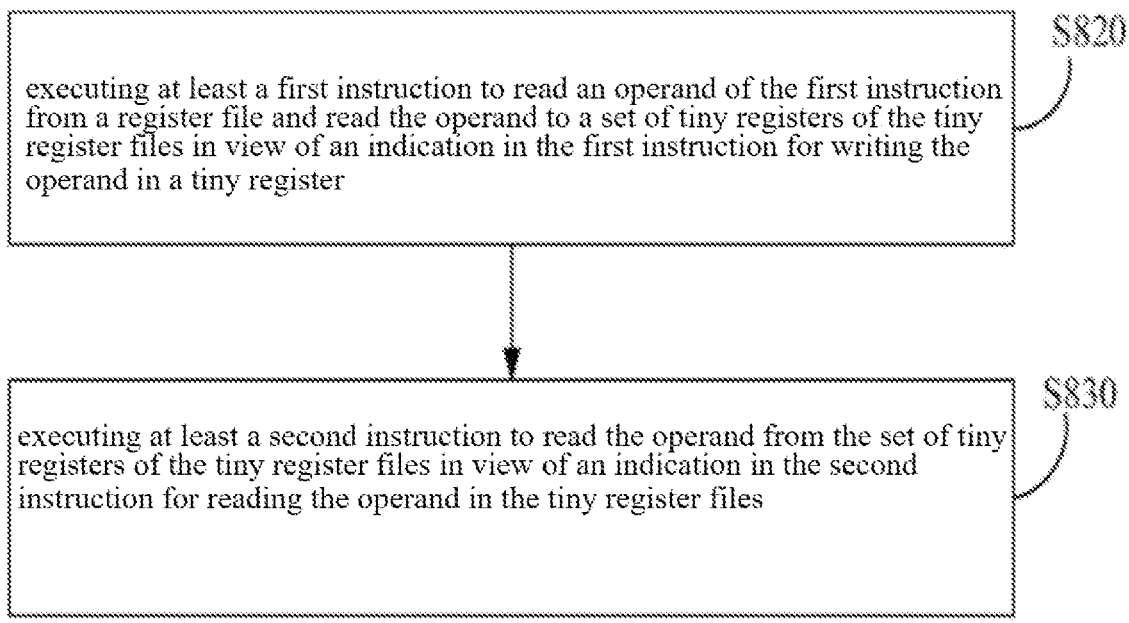
FIG. 8 is a flowchart of a method for executing an instruction with a processor according to an example of the present application.

FIG. 8 is a flowchart of a method for executing an instruction with a processor according to an example of the present application. As shown in FIG. 8, the method for executing an instruction is applicable to the processor in any aforementioned example and comprises the steps of:

S820) executing at least an instruction in the first instruction field which orders an operand to be written to a tiny register file; and reading the operand for a set of tiny registers of the tiny register file when the operand of indication in the first instruction field is being read from the register file; and S830) executing at least an instruction in second instruction field which orders an operand to be read the operand from the tiny register file; and reading the operand from the set of tiny registers of the tiny register file.

In some embodiments, in S820: the instruction in the first instruction filed further orders an output result to be written to the tiny register file; and S820 further includes writing the output result of the instruction in the first instruction field to the set of tiny registers of the tiny register file.

In some embodiments, in S830: the instruction in the second instruction filed further orders an output result to be written to the tiny register file; and S830 further includes writing the output result of the instruction in the second instruction filed to the set of tiny registers of the tiny register file.

Figure 9:
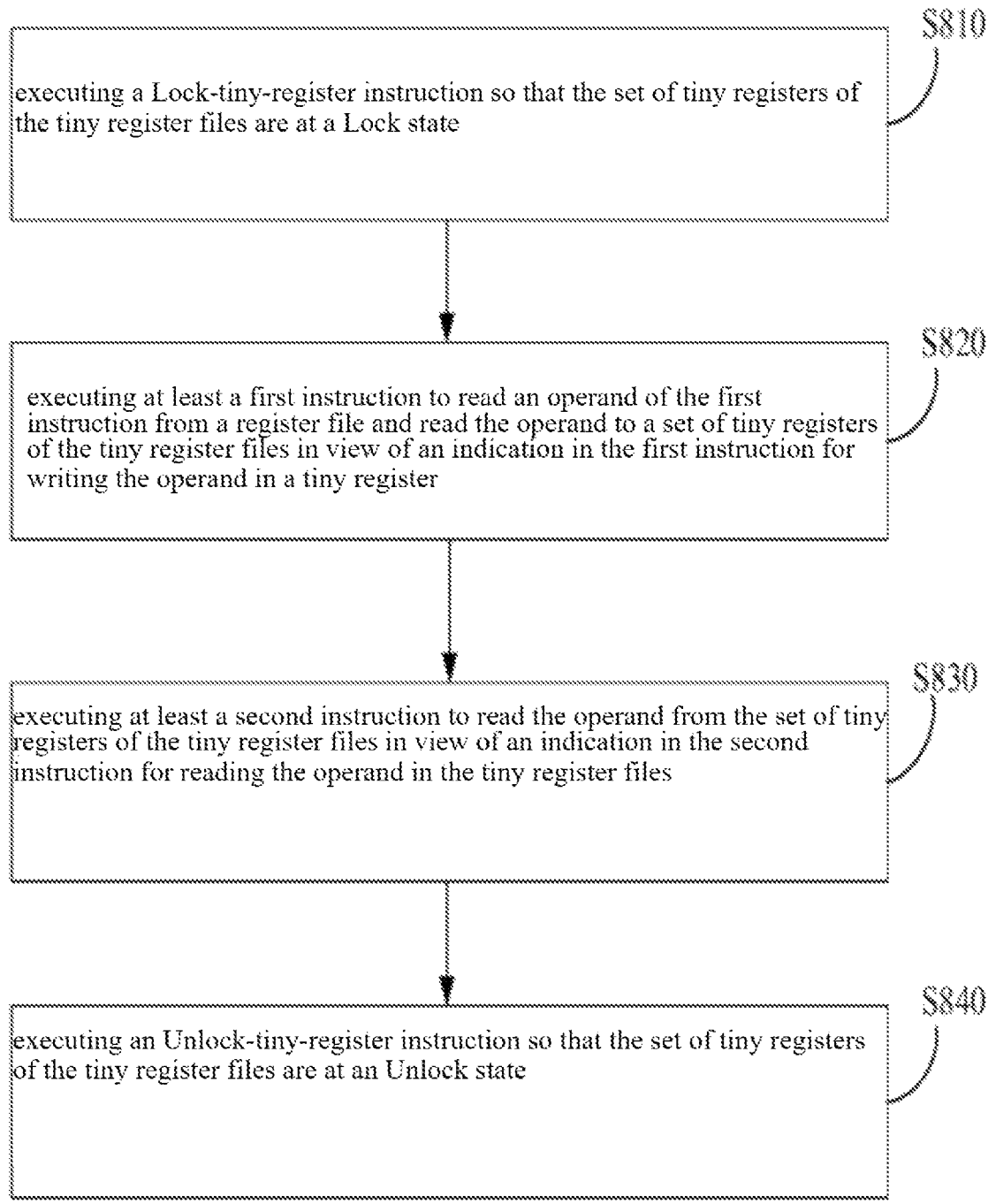
FIG. 9 is a flowchart of a method for executing an instruction with a processor according to a further example of the present application.

In some embodiments, as shown in FIG. 9, the method further comprises S810 which precedes S820; and S810 includes executing an instruction to lock a tiny register; and causing the set of tiny registers of the tiny register file to enter a locked state.

In some embodiments, as shown in FIG. 9, the method further comprises S840 which succeeds S830, and S840 includes executing an instruction to unlock a tiny register; and causing the set of tiny registers of the tiny register file to enter an unlocked state.

In some embodiments, S810 further includes: S810.1) determining whether the tiny register file includes a set of tiny registers which is not in the locked state; and S810.2) if it does not, repeating S810.1 after a designated clock period expires until a set of tiny registers in the tiny register file is not in the locked state.

Figure 10:
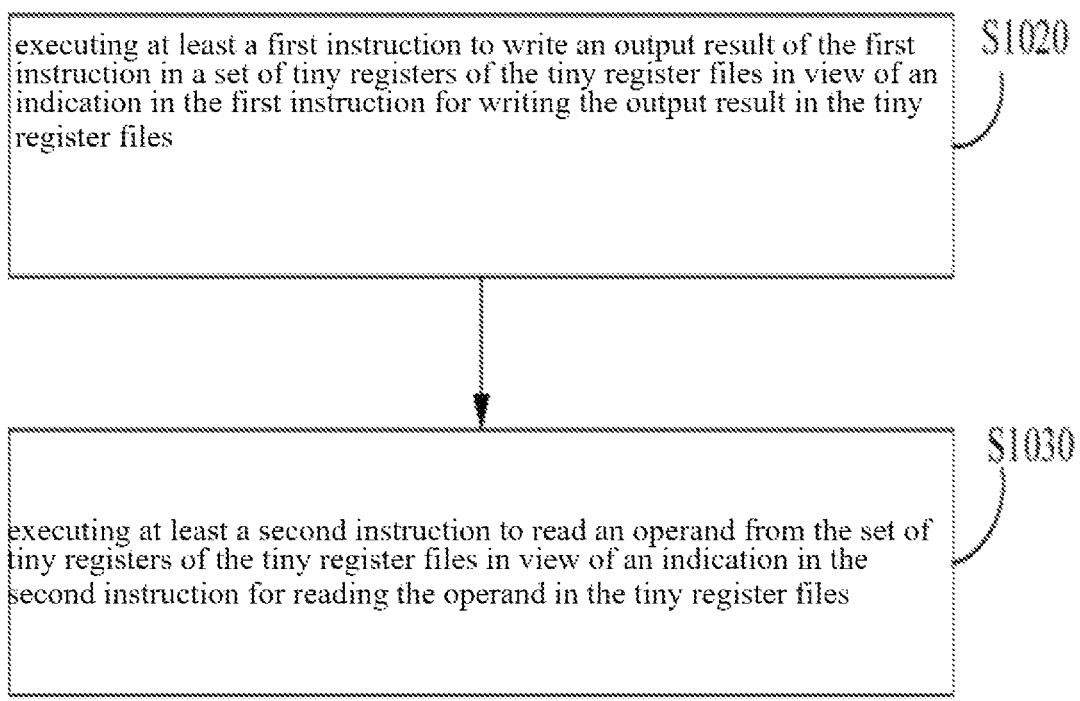
FIG. 10 is a flowchart of a method for executing an instruction with a processor according to another example of the present application.

FIG. 10 is a flowchart of a method for executing an instruction with a processor according to another example of the present application. As shown in FIG. 10, the method for executing an instruction is applicable to the processor in any aforementioned example and comprises the steps of:

S1020) executing at least an instruction in the third instruction field which orders an output result to be written to a tiny register file; and writing the output result of the instruction in the first instruction field to a set of tiny registers of the tiny register file; and S1030) executing at least an instruction in the second instruction filed which orders an operand to be read from the tiny register file; and reading the operand from the set of tiny registers of the tiny register file.

Figure 11:
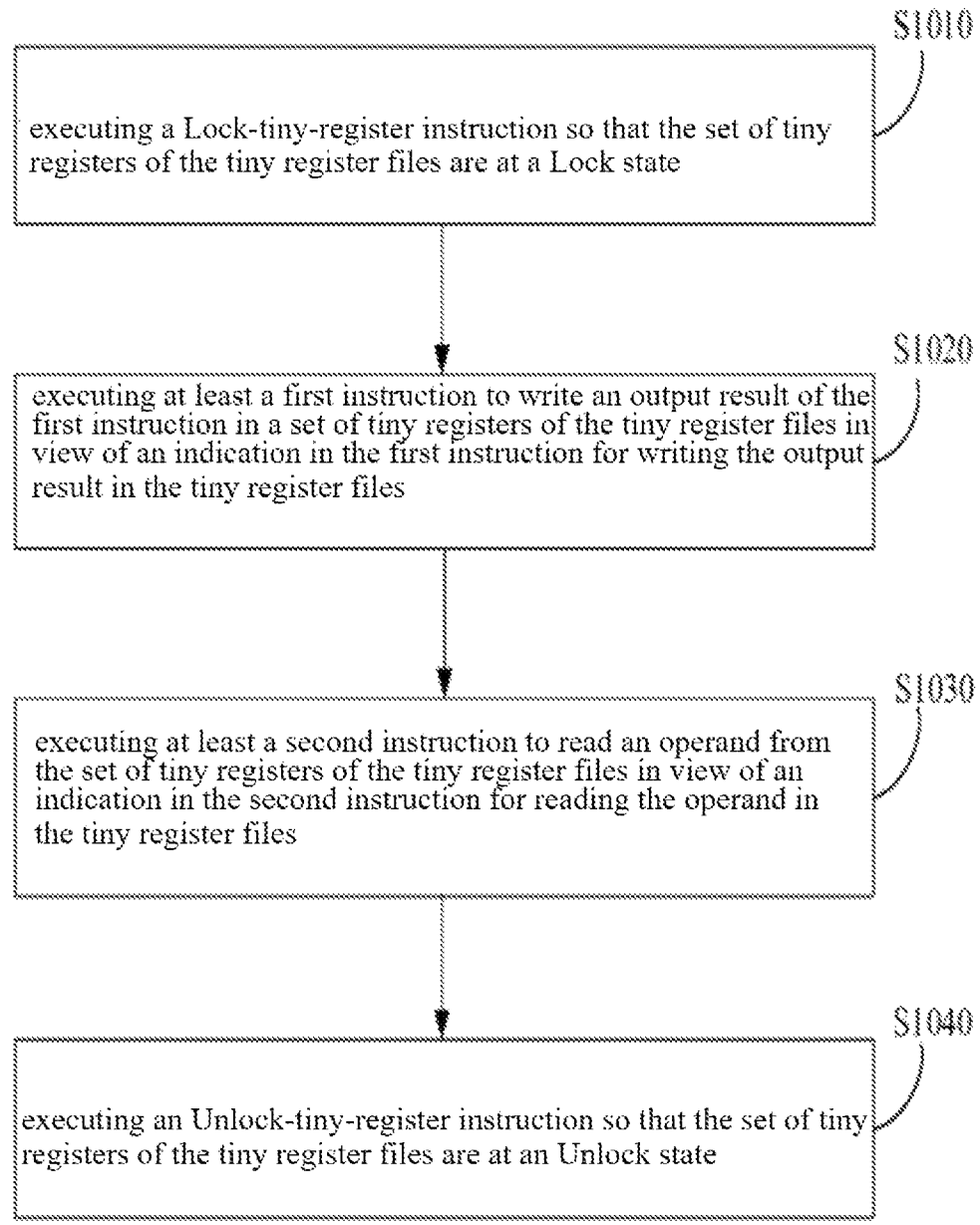
FIG. 11 is a flowchart of a method for executing an instruction with a processor according to a yet another example of the present application.

In some embodiments, as shown in FIG. 11, the method further comprises S1010 which precedes S1020; and S1010 includes executing an instruction to lock a tiny register; and causing the set of tiny registers of the tiny register file to enter a locked state.

In some embodiments, as shown in FIG. 11, the method further comprises S1040 which succeeds S1030; and S1040 includes executing an instruction to unlock a tiny register; and causing the set of tiny registers of the tiny register file to enter an unlocked state.

In some embodiments, S1010 further includes: S1010.1) determining whether the tiny register file includes a set of tiny registers that is not in the locked state; and S1010.2) if it does not, repeating S1010.1 after a designated clock period expires until the tiny register file includes a set of tiny registers that is not in the locked state.

The method for executing an instruction with a processor provided by the embodiments of the present application reduces times of frequently reading of operands from a register file by directly reading an instruction operand from a tiny register file when at least one instruction is executed. Therefore, the embodiment of the present application can significantly reduce reading and writing times of the register files and transforms reading and writing of the tiny register file with lower power consumption, thereby reducing dynamic power consumption due to reading and writing of the register files.

The processor and the method for executing an instruction with a processor provided by the embodiments of the present application can be applied to multi-core processor chips such as a central processing unit (CPU), a graphics processing unit (GPU), a digital processing unit (DSP), a field programmable gate array (FPGA), an artificial intelligence (AI) chip, a video coding and transcoding chip (Video Code), and the like, thereby realizing efficient execution for the branch conditional instruction and improving instruction processing performance.

The steps, units or modules involved in the embodiments of the present application may be implemented by a hardware circuit or a combination of software and hardware logics. Embodiments of the present application are not limited to those described above, and various changes and modifications in forms and details may be made by one of ordinary skill in the art without departing from the spirit and scope of the present application, and these are considered to fall within the scope of the present application.

INDUSTRIAL APPLICABILITY

The invention discloses a processor and a method for executing an instruction with a processor. The processor comprises a set of tiny register files, each of which is connected correspondingly to one of the set of register files and is configured to temporarily store the operand and the output result of the instruction executed by the plurality of physical threads; and an operand collector, which is connected to the set of register files and the set of tiny register files and is configured to read the operand of the instruction executed by the plurality of physical threads from the set of register files and/or from the set of tiny register files and write the output result of the instruction executed by the plurality of physical threads to the set of register files and/or to the set of tiny register files. The embodiment of the application can significantly reduce reading and writing times of the register files when the instructions are executed with the processor and reduce dynamic power consumption of the processing chip.

Furthermore, it is to be understood that the processor and the method for executing an instruction on a processor of the present disclosure are reproducible and may be used in a variety of industrial applications. For example, the processor and the method for executing an instruction on a processor of the present disclosure may be used in the high-performance computing field of a computer.

What is claimed is:

1. A processor, comprising:
   a set of register files;
   a set of tiny register files;
   an operand collector; and
   a set of computing elements, wherein:
   the set of register files is configured to store an operand and a result of an instruction executed by a plurality of physical threads;
   each one of the plurality of physical threads corresponds to exactly one of the set of register files;
   each one of the set of tiny register files is coupled to exactly one of the set of register files;
   the set of tiny register files, which temporarily stores the operand and the result, is configured such that accessing one of the set of tiny register files consumes less power dynamically than accessing one of the set of register files to which the one of the set of tiny register files is coupled;
   the operand collector, which is in communication with the set of register files and with the set of tiny register files, is configured to:
   read the operand from the one of the set of tiny register files, at least once, in lieu of the one of the set of register files which would otherwise be read repetitively for the operand; and/or
   write the result to the one of the set of tiny register files, at least once, in lieu of the one of the set of register files which would otherwise be written repetitively with the result;
   the set of computing elements, which is in communication with the operand collector, is configured to:
   acquire the operand from the operand collector;
   perform computation in the execution of the instruction; and
   output the result to the operand collector;
   each one of the set of tiny register files includes at least two sets of tiny registers; and
   each one set of the at least two sets of tiny registers is concurrently accessible to no more than one of a plurality of warps dispatched by the processor.

2. The processor in claim 1, wherein: the processor is configured to dispatch the plurality of warps with one single instruction.

3. The processor in claim 1, wherein;
the set of register files is implemented with an SRAM; and
the at least two sets of tiny registers are implemented with D latches.

4. The processor in claim 1, wherein, each one set of the at least two sets of tiny registers has a locked state and an unlocked state:
when one set of the at least two sets of tiny registers is assessed by one of the plurality of warps, the one set of tiny registers is in the locked state; but
when one set of the at least two sets of tiny registers is not assessed by any one of the plurality of warps, the one set of tiny registers is in the unlocked state.

5. The processor in claim 4, wherein: one set of the at least two sets of tiny registers is configured to permit access by a warp only when the one set of tiny registers is in the unlocked state.

6. The processor in claim 5, wherein one set of the at least two sets of tiny registers is configured to:
enter the locked state in response to an order to lock; and
enter the unlocked state in response to an order to unlock.

7. The processor in claim 1, wherein: the instruction includes an instruction field configured to cause the operand to be written to one set of the at least two sets of tiny registers when the operand is being read from the one of the set of register files for the operand collector.

8. The processor in claim 1, wherein: the instruction includes an instruction field configured to cause the operand to be read from one set of the at least two sets of tiny registers for the operand collector.

9. The processor in claim 1, wherein: the instruction includes an instruction field configured to cause the result to be written from the operand collector to one set of the at least two sets of tiny registers.

10. The processor in claim 4, further comprising an identifier for indicating whether one set of the at least two sets of tiny registers is in the locked state.

11. A method for executing an instruction with the processor in claim 1, wherein:
the instruction includes a first instruction field and a second instruction field;
the first instruction field is configured to cause the operand to be written to one set of the at least two sets of tiny registers when the operand is being read from one of the set of register files for the operand collector;
the second instruction field is configured to cause the operand to be read from one set of the at least two sets of tiny registers for the operand collector; and
the method comprises the steps of:
S20) executing the instruction in the first instruction field, including:
writing the operand to one of the set of tiny register files; and
reading the operand for one set of the at least two sets of tiny registers when the operand in the first instruction field is being read from one of the set of register files; and
S30) executing the instruction in the second instruction field, including:
reading the operand from one of the set of tiny register files; and
reading the operand from one set of the at least two sets of tiny registers.

12. The method in claim 11, wherein S20 further includes:
writing the result to one of the set of tiny register files; and
writing the result in the first instruction field to one set of the at least two sets of tiny registers.

13. The method in claim 11, wherein S30 further includes:
writing the result to one of the set of tiny register files; and
writing the result in the second instruction filed to one set of the at least two sets of tiny registers.

14. The method in claim 11, further comprising, before S20, the step of S10, which includes:
S10.1) causing one set of the at least two sets of tiny registers to enter a locked state.

15. The method in claim 14, further comprising, after S30, the step of:
S40) causing one set of the least two sets of tiny registers to enter an unlocked state.

16. The method in claim 14, wherein S10 further includes:
S10.2) determining whether one of the set of tiny register files includes any one set of the at least two sets of tiny registers which is not in the locked state; and
S10.3) if it does not, repeating S10.2 after a designated clock period expires until it does.

17. A method for executing an instruction with the processor in claim 1, wherein:
the instruction includes a first instruction field and a second instruction field;
the first instruction field is configured to cause the operand to be read from one set of the at least two sets of tiny registers for the operand collector;
the second instruction field is configured to cause the result to be written from the operand collector to one set of the at least two sets of tiny registers; and
the method comprises the steps of:
S20) executing the instruction in the second instruction field, including:
writing the result to one of the set of tiny register files; and
writing the result to one set of the at least two sets of tiny registers; and
S30) executing the instruction in the first instruction field, including:
reading the operand from one of the set of tiny register files; and
reading the operand from one set of the at least two sets of tiny registers.

18. The method in claim 17, further comprising, before S20, the step of S10, which includes:
S10.1) causing one set of the at least two sets of tiny registers to enter a locked state.

19. The method in claim 17, further comprising, after S30, the step of:
S40) causing one set of the at least two sets of tiny registers to enter an unlocked state.

20. The method in claim 18, wherein S10 further includes:
S10.2) determining whether one of the set of tiny register files includes any one set of the least two sets of tiny registers that is not in the locked state; and
S10.3) if it does not, repeating S10.2 after a designated clock period expires until it does.

* * * * *